US008837936B2

(12) United States Patent
Sarwar et al.

(10) Patent No.: US 8,837,936 B2
(45) Date of Patent: Sep. 16, 2014

(54) METHOD AND SYSTEM FOR DYNAMIC SELECTION OF TRANSPORT PATH WITH LOWEST LATENCY

(75) Inventors: Muhammad S. Sarwar, Brookfield, CT (US); Zigmunds Andis Putnins, Ridgewood, NJ (US); Jaya Sarup, Monroe, NY (US); Zanjun Lu, Edison, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 157 days.

(21) Appl. No.: 13/531,856

(22) Filed: Jun. 25, 2012

(65) Prior Publication Data
US 2013/0343747 A1 Dec. 26, 2013

(51) Int. Cl.
*H04B 17/00* (2006.01)
(52) U.S. Cl.
USPC ................................. 398/25; 398/53; 398/58
(58) Field of Classification Search
USPC ........ 398/5, 33, 58, 47, 51, 53, 68, 70–72, 25
See application file for complete search history.

(56) References Cited

U.S. PATENT DOCUMENTS

| 8,229,705 | B1* | 7/2012 | Mizrahi et al. | 702/182 |
| 2008/0101368 | A1* | 5/2008 | Weinman | 370/392 |
| 2009/0010248 | A1* | 1/2009 | Kanai | 370/352 |
| 2009/0141703 | A1* | 6/2009 | Ghodrat et al. | 370/352 |
| 2010/0166419 | A1* | 7/2010 | Elmoalem et al. | 398/2 |
| 2013/0336129 | A1* | 12/2013 | Shanmugam et al. | 370/241.1 |

* cited by examiner

*Primary Examiner* — Dalzid Singh
(74) *Attorney, Agent, or Firm* — Baker Botts L.L.P.

(57) ABSTRACT

In accordance with a particular embodiment of the present disclosure, a network element may include a network-side interface configured to communicatively couple to a network and a controller communicatively coupled to the network-side interface. The controller may be configured to periodically receive one or more messages indicative of a delay for each of a plurality of paths for a network flow between the network element and a second network element, periodically compare the delays for the plurality of paths, and select a path for a network flow from the plurality of paths based on the delays.

20 Claims, 4 Drawing Sheets

US 8,837,936 B2

METHOD AND SYSTEM FOR DYNAMIC SELECTION OF TRANSPORT PATH WITH LOWEST LATENCY

TECHNICAL FIELD OF THE INVENTION

The present invention relates generally to optical networks and, more particularly, to a method and system for dynamic selection of a transport path with lowest latency in a communication system.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ redundancies to maximize performance and availability. Such redundancies may include optical unidirectional path switched ring (OUPSR). With OUPSR, an optical signal may be transmitted via two or more optical paths between the same source and destination node. An OUPSR device at the destination may include a photodetector per each path to monitor signals received from the two or more paths. Based on such received signals, the OUPSR device may select one of the signals to be forwarded to a transponder or receiver at the destination node. For example, the OUPSR may determine, based on the photodetector monitoring, whether one of the paths has experienced a loss of signal or "loss of light." If a particular path experiences a loss of light, then the OUPSR may select another path to forward to the transponder or receiver. Such selection may be referred to as a "protection switch."

A particular communication network may include a plurality of network elements for carrying Ethernet traffic between two or more clients via a synchronous optical network (SONET), Optical Transport Network (OTN), or another suitable network. End-to-end latency between clients in an OTN or SONET network may vary between end-to-end paths based on the number of links in a path, regeneration of paths, and other factors. In addition, latency for a single path may vary over time due to reconfiguration of the network. Latency is a prime importance for many applications, and customers of a network may pay premiums such that their network traffic experiences the smallest amount of latency. However, relevant SONET and OTN standards do not provide a way to calculate end to end latency to allow selection of an OTN or SONET path based on latency for an individual Ethernet flow.

SUMMARY

In accordance with a particular embodiment of the present disclosure, a network element may include a network-side interface configured to communicatively couple to a network and a controller communicatively coupled to the network-side interface. The controller may be configured to periodically receive one or more messages indicative of a delay for each of a plurality of paths for a network flow between the network element and a second network element, periodically compare the delays for the plurality of paths, and select a path for a network flow from the plurality of paths based on the delays.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
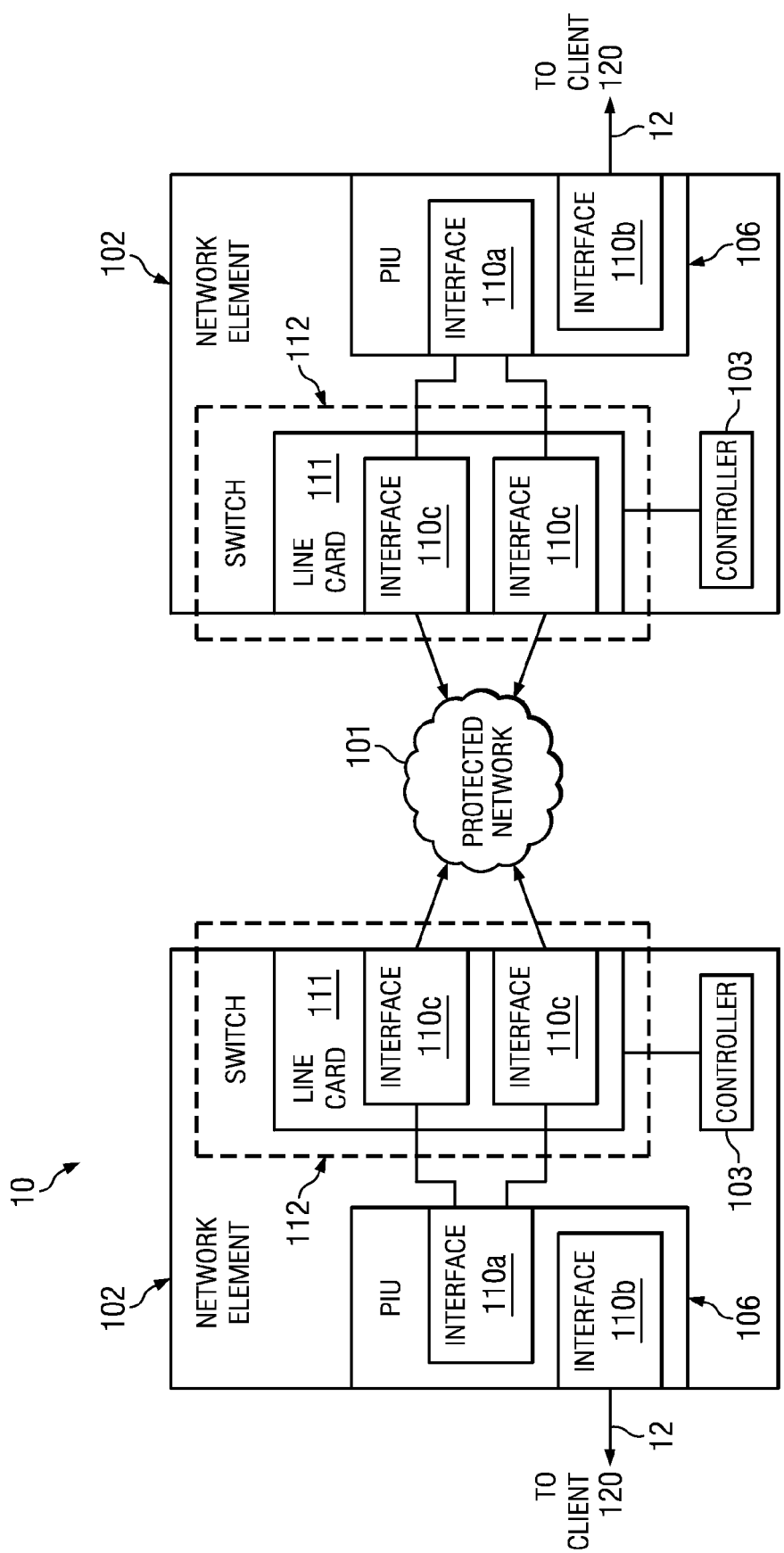
FIG. 1 is a block diagram illustrating an example optical network, in accordance with embodiments of the present disclosure.

FIG. 1 illustrates a block diagram of an example communication network 10, in accordance with embodiments of the present disclosure. In certain embodiments, network 10 may comprise a network configured to provide for Ethernet datagram (e.g., packets, frames) communication via synchronous optical networking (SONET). In other embodiments, network 10 may comprise a network configured to provide for Ethernet datagram communication via Optical Transport Network (OTN). Network 10 may include one or more transmission media 12 operable to transport one or more signals communicated by components of network 10. The components of network 10, coupled together by transmission media 12, may include a plurality of network elements 102 and a protected network 101. Network 10 may be used in a short-haul metropolitan network, a long-haul inter-city network, or any other suitable network or combination of networks.

Each transmission medium 12 may include any system, device, or apparatus configured to communicatively couple network elements 102 to each other, protected network 101, and/or client interfaces 110b, and communicate information between network elements 102 and protected network 101 and between network elements 102 and client interfaces 110b. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" may refer to a frame, packet, or other data structure for transmission of traffic.

Protected network 101 may include any system configured to switch, forward, and/or route traffic between network elements 102. Protected network 101 may comprise an OTN, SONET network, or any other suitable network. Protected network 101 may comprise a plurality of optical nodes each configured to provide switching, forwarding, and/or routing functionality. As its name indicates, protected network 101 may employ a protection methodology to provide redundancy protection in the event of a failure. To provide protection, protected network 101 may employ unidirectional path-switched ring (UPSR), birectional line-switched ring (BLSR), automatic protection switching (APS), or another suitable protection scheme.

A client interface 110b may provide an interface between a network element 102 and clients (e.g., customers) of a network provider. In addition, protected network 101 may comprise a provider network.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Generally speaking, a network element 102 may perform datagram segmentation, reassembly, and other tasks in order to convert Ethernet packets received at a client interface 110b to frames (e.g., SONET or OTN frames) for communication via protected network 101, and vice versa. As shown in FIG. 1, each network element 102 may include a controller 103, a plurality of plug-in units (PIU) 106, and a line card 111.

Controller 103 may include any suitable system, apparatus, or device configured to manage a network element 102, including selection of a path for network flows, as described in greater detail below. Controller 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. Although FIG. 1 depicts controller 103 as a component independent from PIUs 106, in some embodiments one or more processors 103 may reside on PIUs 106 and/or other components of a network element 102.

A PIU 106 may include any system, device, or apparatus having plug-in terminals so that some or all electrical connections of the PIU 106 can be made engaging the unit with a suitable socket of network element 102. A PIU 106 may generally be configured to forward datagrams between a client and a line card 111 via interfaces 110. In some embodiments, a PIU 106 may be configured to perform datagram segmentation, reassembly, and other tasks in order to convert Ethernet packets received at a client interface 110b to frames for communication via protected network 101, and vice versa. As shown in FIG. 1, a PIU 106 may include a network-side interface 110a and a client-side interface 110b.

A network-side interface 110a may include any suitable system, apparatus, or device configured to serve as an interface between a network element 102 and line card 111. A client-side interface 110b may include any suitable system, apparatus, or device configured to serve as an interface between a network element 102 and a transmission medium 12 communicatively coupling such network element 102 to a client 120. An interface 110 (e.g., a network-side interface 110a and/or a client-side interface 110b) may enable its associated network element 102 to communicate with a line card 111 or a client 120, as applicable, using any suitable transmission protocol and/or standard. An interface 110 may be implemented using hardware, software, or any combination thereof. For example, an interface 110 may comprise an Ethernet port, an optical port, or any other suitable port.

A line card 111 may include any system, device, or apparatus configured to serve as a communication interface between network-side interfaces 110a and protected network 101. As depicted in FIG. 1, a line card 111 may include a plurality of interfaces 110c, allowing for redundant paths to be established between network elements 102. A line card interface 110c may enable its associated network element 102 to communicate with protected network 101 and/or a network-side interface 110a, using any suitable transmission protocol and/or standard. An interface 110 may be implemented using hardware, software, or any combination thereof. For example, an interface 110 may comprise an Ethernet port, an optical port, or any other suitable port. A line card 111 may be an integral part of a switch 112 (e.g., a SONET or OTN switch), as shown in FIG. 1.

In operation, a controller 103 and/or another component of a network element 102 may determine a network path via protected network 101 having the lowest latency for a particular network flow, and select such path for transmission of the particular network flow. In addition, such selection of the lowest latency path may be dynamic, in that as the latencies of various paths change such that the identity of the lowest latency path changes, so too will the path selected.

To implement the dynamic selection, network 10 may be configured such that a number of different paths of protected network 101 may carry traffic for a particular network flow (e.g., Ethernet flow), and that traffic for such network flow is replicated on each such path. A controller 103 may periodically trigger a calculation for the delay in each path from a transmitting network element 102 to a receiving network element 102. In some embodiments, such calculation may be performed by a Service Operation, Administration, and Management (SOAM) Delay Measurement (DM) function in accordance with IEEE 802.1ag and/or ITU-T Y.1731. Based on the delay values for each of the paths, a controller 103 (e.g., a controller 103 at the receiving network element 102) may select the path with the shortest delay and, if necessary, switch the traffic for the network flow to a newly selected path. In some embodiments, triggering and delay measurement could be performed solely at receiving network element 102 (e.g., using two-way SOAM DM), in which case selection of the lowest-latency path could be made by the receiving network element 102 without any coordination with the transmitting network element.

Figure 2:
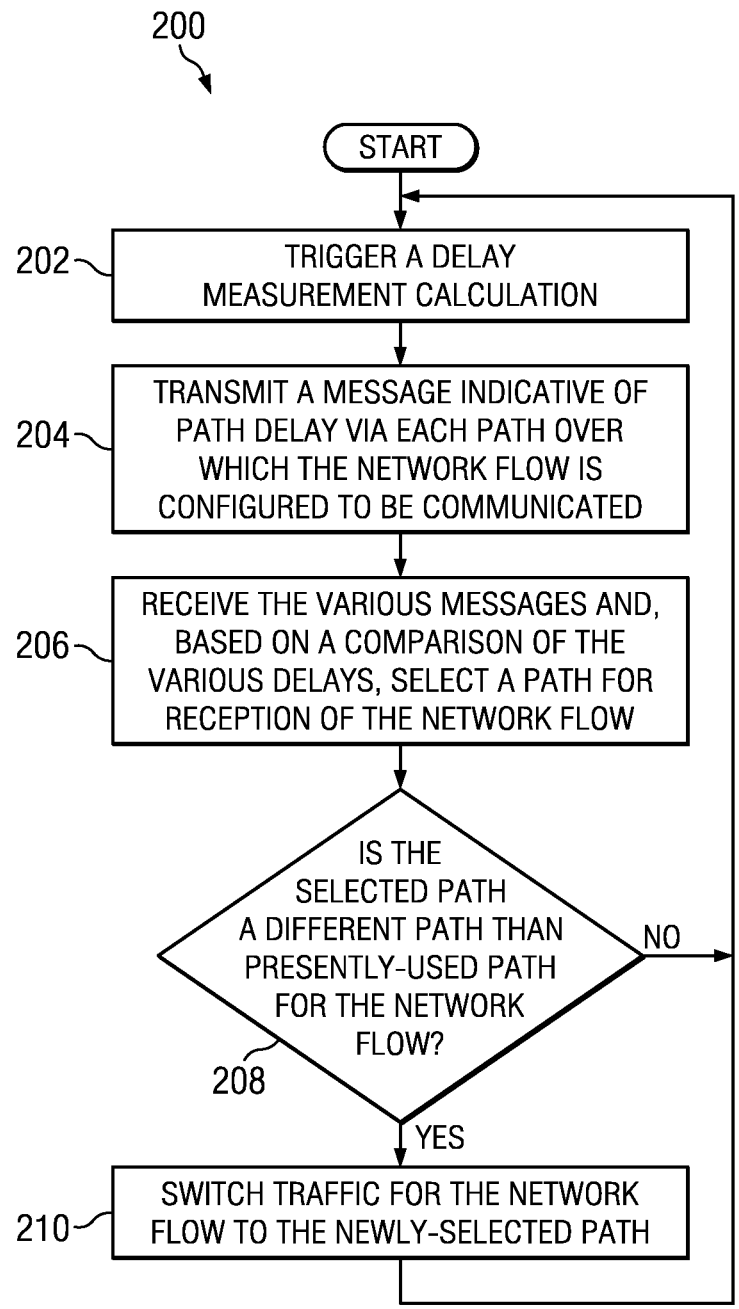
FIG. 2 illustrates a flow chart of an example method for dynamic selection of a transport path with lowest latency, in accordance with embodiments of the present disclosure.

FIG. 2 illustrates a flow chart of an example method 200 for dynamic selection of a transport path with lowest latency, in accordance with embodiments of the present disclosure. According to at least one embodiment, method 200 preferably begins at operation 202. As noted above, teachings of the present disclosure may be implemented in a variety of configurations of network 10. As such, the preferred initialization point for method 200 and the order of the operations 202-210 comprising method 200 may depend on the implementation chosen.

At operation 202, a controller 103 and/or another component of a receiving network element 102 for a network flow may trigger a delay measurement calculation.

At operation 204, in response to the trigger, a transmitting network element 102 for the network flow may transmit a message (e.g., a SOAM DM) via each path over which the network flow is able to be communicated, wherein such message, upon receipt by the receiving network element 102, is indicative of a delay through a particular path.

At operation 206, controller 103 and/or another component of receiving network element 102 may receive the various messages indicative of the various path delays and, based on a comparison of the various delays, select a path for reception of the network flow.

At operation 208, controller 103 and/or another component of receiving network element 102 may determine if the selected path is a different path than presently-used path for the network flow. Although a plurality of paths in protected network 101 may be able to carry traffic, controller 103 and/or another component of receiving network element 102 may receive network flow traffic over a selected one of the plurality of paths at a given time. Thus, the presently-used path may be an existing path upon which traffic for a network flow is currently received by the receiving network element 102. The presently-used path may be a default path selected at start-up of protected network 101 or receiving network element 102, a path selected by a user or administrator, or a path selected during a previous iteration of operations 202-210. If the selected path is a different path than the presently-used path, method 200 may proceed to operation 210. Otherwise, method 200 may proceed again to operation 202, where the dynamic selection process may continue.

At operation 210, in response to a determination that that the selected path is different than the presently-used path for the network flow, controller 103 and/or another component of receiving network element 102 may switch traffic for the network flow to the newly-selected path. After completion of operation 210, method 200 may proceed again to operation 202, where the dynamic selection process may continue.

Although FIG. 2 discloses a particular number of steps to be taken with respect to method 200, it is understood that method 200 may be executed with greater or lesser operations than those depicted in FIG. 2. In addition, although FIG. 2 discloses a certain order of operations to be taken with respect to method 200, the operations comprising method 200 may be completed in any suitable order.

Method 200 may be implemented using a controller 103 or any other system operable to implement method 200. In certain embodiments, method 200 may be implemented partially or fully in software embodied in computer-readable media and executable by a processor (e.g., controller 103).

Applying the methods and systems described above, the working path for a network flow of a protected network (e.g., one employing UPSR, BLSR, or APS) may be selected based on the delay measurements of various paths, regardless of protection switching scheme (e.g., 1+1, n+1, etc.). For example, as those or ordinary skill in the relevant art may appreciate, a UPSR protected network employing a 1+1 protection switching scheme may during operation maintain a working path and a protected path between two network elements. Typically, in the event of a fault in the working path, traffic is switched from the working path to the protected path, thus providing fault-resistant redundant communication. Traditionally, the designation of working path and protected path has been static—once the working path is selected, it remains the working path unless and until a fault occurred preventing communication of traffic over the working path. However, using the methods and systems described above, working path selection may be dynamic, in that delays through the designated working path and protected path may be periodically determined, and a receiving network element may designate the path with the shortest delay as the working path, and designate the other path as the protected path.

In addition or alternatively to detecting a delay of each possible path for a network flow, a receiving network element 102 may also determine the rate of traffic loss (e.g., packet loss, frame loss) for each possible path, and select a path for the network flow based on the traffic loss measurement in addition to or in lieu of the latency measurement. In some embodiments, such calculation may be performed by a SOAM Frame Loss Measurement (LM) function in accordance with IEEE 802.1ag and/or ITU-T Y.1731.

Further, although the foregoing contemplates selection of a path by a network element, any suitable component of a network may select a path for a network flow. For example, in some embodiments a network management station may determine a path with the lowest latency and/or frequency of frame loss and, based on such determination, select a path for a network flow.

Figure 3:
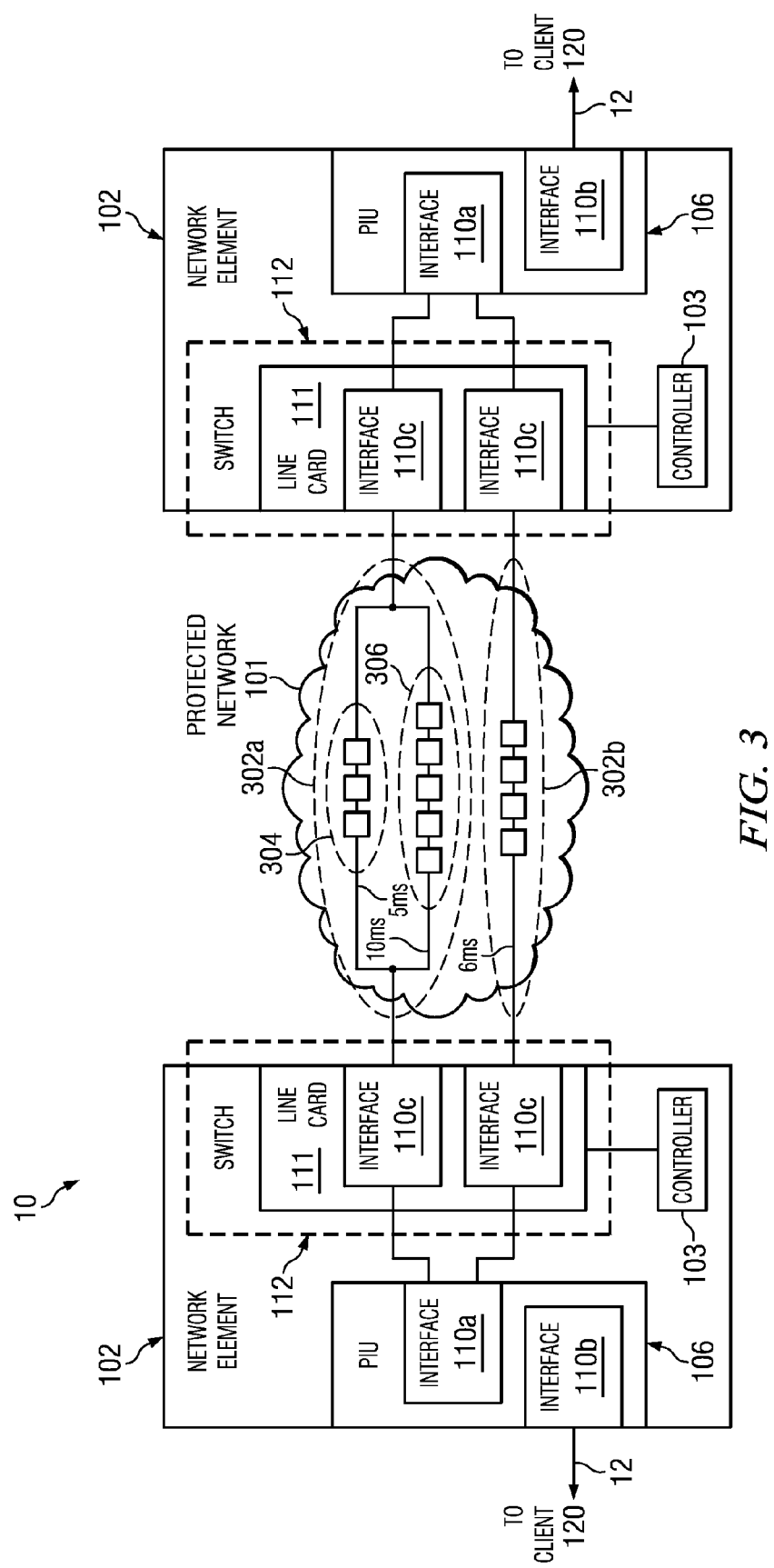
FIG. 3 is a block diagram illustrating an example protected network to which the methods and systems of the present disclosure may be applied, in accordance with embodiments of the present disclosure.

FIG. 3 is a block diagram illustrating an example protected network 101 to which the methods and systems of the present disclosure may be applied, in accordance with embodiments of the present disclosure. In the example of FIG. 3, numerous paths 302 exist between network elements 102, including a protection path 302a (e.g., a UPSR protection path) within protected network 101. A working path 304 of such protection path may have a latency of 5 milliseconds (5 ms) while the protected path 306 has a latency of 10 ms. Applying the operations of method 200, receiving network element 102 may trigger a delay measurement calculation (operation 202). In response, transmitting network element 202 may transmit a message indicative of a path delay (e.g., a SOAM DM) via each of paths 302a and 302b (operation 204). Upon receipt of the messages, receiving network element 102 may compare the various delays (e.g., 5 ms for path 302a, and 6 ms for path 302b) and based on such comparison, select the path with the shortest delay (path 302a) for reception of the network flow (operation 206). Assuming path 302a was the presently-used path at the time the delay measurement calculation was triggered, receiving network element 102 simply continues receiving traffic via 302a (operation 208).

Assume at some time during operation, working path 304 experiences a fault. In response to the fault, UPSR may switch traffic from working path 304 to protected path 306, at which point the delay in path 302a becomes 10 ms. At some time after this protection switch, receiving network element 102 may trigger a delay measurement calculation (operation 202). In response, transmitting network element 202 may transmit a message indicative of a path delay (e.g., a SOAM DM) via each of paths 302a and 302b (operation 204). Upon receipt of the messages, receiving network element 102 may compare the various delays (e.g., 10 ms for path 302a, and 6 ms for path 302b) and based on such comparison, select the path with the shortest delay (path 302b) for reception of the network flow (operation 206). Because path 302a was the presently-used path at the time the delay measurement calculation was triggered, receiving network element 102 switches from presently-used path 302a to newly-selected path 302b in its receipt of traffic for the network flow (operations 208 and 210).

Figure 4:
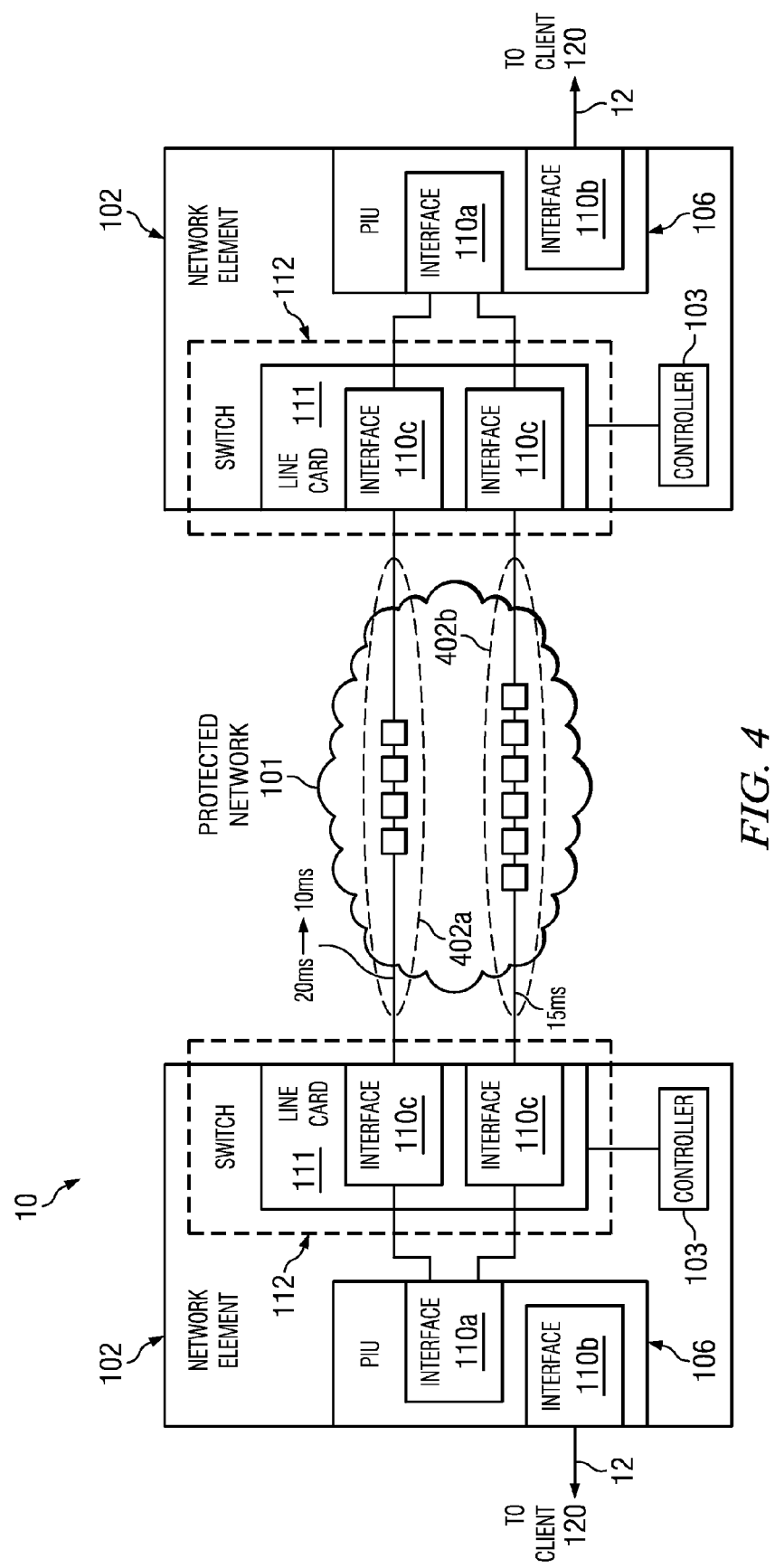
FIG. 4 is a block diagram illustrating another example protected network to which the methods and systems of the present disclosure may be applied, in accordance with embodiments of the present disclosure.

FIG. 4 is a block diagram illustrating another example protected network 101 to which the methods and systems of the present disclosure may be applied, in accordance with embodiments of the present disclosure. In the example of FIG. 4, end-to-end UPSR protection paths 402a and 402b may exist between network elements 102, each with a different latency (e.g., 20 ms for path 402a and 15 ms for path 402b). Initially, path 402b may be selected as the working path. Applying the operations of method 200, receiving network element 102 may trigger a delay measurement calculation (operation 202). In response, transmitting network element 202 may transmit a message indicative of a path delay (e.g., a SOAM DM) via each of paths 402a and 402b (operation 204). Upon receipt of the messages, receiving network element 102 may compare the various delays (e.g., 20 ms for path 402a, and 15 ms for path 402b) and based on such comparison, select the path with the shortest delay (path 402b) for reception of the network flow (operation 206). As path 402b is the presently-used path, receiving network element 102 simply continues receiving traffic via 402b and continues to designate path 402b as the working path (operation 208).

Due to a change in protected network 101, path 402a may at a later time have a shorter latency (e.g., 10 ms). At some time after this change, receiving network element 102 may trigger a delay measurement calculation (operation 202). In response, transmitting network element 202 may transmit a message indicative of a path delay (e.g., a SOAM DM) via each of paths 402a and 402b (operation 204). Upon receipt of the messages, receiving network element 102 may compare the various delays (e.g., 10 ms for path 402a, and 15 ms for path 402b) and based on such comparison, select the path with the shortest delay (path 402a) for reception of the network flow (operation 206). Because path 402b was the presently-used path at the time the delay measurement calculation was triggered, receiving network element 102 switches from presently-used path 402b to newly-selected path 402a in its receipt of traffic for the network flow (operations 208 and 210), and newly-selected path 402a may be selected as the working path for UPSR.

A component of optical network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to optical network 10 without departing from the scope of the invention. The components of optical network 10 may be integrated or separated. Moreover, the operations of optical network 10 may be performed by more, fewer, or other components. Additionally, operations of optical network 10 may be performed using any suitable logic. As used in this document, "each" refers to each member of a set or each member of a subset of a set.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could me made hereto without departing from the spirit and scope of the invention.

What is claimed is:

1. A network element comprising:
   a network-side interface configured to communicatively couple to a network; and
   a controller communicatively coupled to the network-side interface and configured to:
      periodically receive one or more messages indicative of a delay for each of a plurality of paths for a network flow between the network element and a second network element, the one or more messages indicative of a delay for each particular path being received over that particular path;
      periodically compare the delays for the plurality of paths; and
      select a path for the network flow from the plurality of paths based on the delays.

2. The network element of claim 1, the controller further configured to:
   determine if the selected path is different than a presently-used path; and
   switch traffic for the network flow from the presently-used path to the selected path if the selected path is different than the presently-used path.

3. The network element of claim 1, wherein the one or more messages comprise a Service Operation, Administration, and Management Delay Measurement function.

4. The network element of claim 1, wherein the network flow comprises an Ethernet over synchronous optical network flow.

5. The network element of claim 1, wherein the network flow comprises an Ethernet over Optical Transport Network flow.

6. The network element of claim 1, wherein the selected path is a path with the shortest delay.

7. The network element of claim 1, the controller further configured to periodically determine for each of the plurality of paths a volume of traffic loss, wherein the selected path is based on the volume of traffic loss and the delay of each of the plurality of paths.

8. A network comprising:
   a protected network;
   a first network element communicatively coupled to the protected network; and a second network element communicatively coupled to the first network element via the protected network via a plurality of paths of the protected network, the second network element configured to:
  periodically receive one or more messages indicative of a delay for each of a plurality of paths for a network flow between the first network element and a second network element, the one or more messages indicative of a delay for each particular path being received over that particular path;
  periodically compare the delays for the plurality of paths; and
  select a path for the network flow from the plurality of paths based on the delays.

9. The network of claim 8, the second network element further configured to:
  determine if the selected path is different than a presently-used path; and
  switch traffic for the network flow from the presently-used path to the selected path, if the selected path is different than the presently-used path.

10. The network of claim 8, wherein the one or more messages comprise a Service Operation, Administration, and Management Delay Measurement function.

11. The network of claim 8, wherein the network flow comprises an Ethernet over synchronous optical network flow.

12. The network of claim 8, wherein the network flow comprises an Ethernet over Optical Transport Network flow.

13. The network of claim 8, wherein the selected path is a path with the shortest delay.

14. The network of claim 8, the second network element further configured to periodically determine for each of the plurality of paths a volume of traffic loss, wherein the selected path is based on the volume of traffic loss and the delay of each of the plurality of paths.

15. A method comprising:
  periodically receiving one or more messages indicative of a delay for each of a plurality of paths for a network flow between a first network element and a second network element, the one or more messages indicative of a delay for each particular path being received over that particular path;
  periodically comparing the delays for the plurality of paths; and
  selecting a path for the network flow from the plurality of paths based on the delays.

16. The method of claim 15, further comprising:
  determining if the selected path is different than a presently-used path; and
  switching traffic for the network flow from the presently-used path to the selected path if the selected path is different than the presently-used path.

17. The method of claim 15, wherein the one or more messages comprise a Service Operation, Administration, and Management Delay Measurement function.

18. The method of claim 15, wherein the network flow comprises one of an Ethernet over synchronous optical network flow and an Ethernet over Optical Transport Network flow.

19. The method of claim 15, wherein the selected path is a path with the shortest delay.

20. The method of claim 15, further comprising periodically determining for each of the plurality of paths a volume of traffic loss, wherein the selected path is based on the volume of traffic loss and the delay of each of the plurality of paths.

* * * * *